United States Patent
Hoyt

(10) Patent No.: US 8,215,844 B1
(45) Date of Patent: Jul. 10, 2012

(54) DEBRIS RESISTANT BEARING SYSTEM AND METHOD

(75) Inventor: Philip M. Hoyt, Murray, UT (US)

(73) Assignee: Pure Technologies (U.S.) Inc. (CA)

( * ) Notice: Subject to any disclaimer, the term of this patent is extended or adjusted under 35 U.S.C. 154(b) by 236 days.

(21) Appl. No.: 12/781,655

(22) Filed: May 17, 2010

(51) Int. Cl.
*F16C 19/00* (2006.01)
*G01M 3/08* (2006.01)

(52) U.S. Cl. .................................. 384/473; 73/49.1

(58) Field of Classification Search .............. 384/473; 33/777
See application file for complete search history.

(56) References Cited

U.S. PATENT DOCUMENTS

| | | | |
|---|---|---|---|
| 3,251,634 A * | 5/1966 | Dareing | 384/93 |
| 3,769,711 A * | 11/1973 | Flournoy et al. | 33/777 |
| 3,862,497 A * | 1/1975 | Vernooy et al. | 33/777 |
| 4,857,851 A | 8/1989 | Anderson et al. | |
| 4,953,412 A | 9/1990 | Rosenberg et al. | |
| 4,964,059 A | 10/1990 | Sugaya et al. | |
| 5,447,377 A | 9/1995 | Baumgartner et al. | |
| 5,454,276 A | 10/1995 | Wernicke | |
| 5,532,587 A | 7/1996 | Downs et al. | |
| 5,565,633 A | 10/1996 | Wernicke | |
| 5,864,232 A | 1/1999 | Laursen | |
| 5,934,761 A | 8/1999 | Yates | |
| 6,023,986 A | 2/2000 | Smith et al. | |
| 6,031,371 A | 2/2000 | Smart | |
| 6,834,859 B2 | 12/2004 | Tones | |
| 6,847,207 B1 | 1/2005 | Veach | |

* cited by examiner

*Primary Examiner* — Hezron E. Williams
*Assistant Examiner* — Nathaniel Kolb
(74) *Attorney, Agent, or Firm* — Warren M. Pate, LLC

(57) ABSTRACT

A system and method are disclosed for protecting bearings operating in dirty environments. The system may include a reservoir of lubricant, a bearing, and a regulator. The bearing may border on both the dirty environment and the reservoir. Accordingly, the bearing may be exposed to the solid particles carried by the fluid within the environment, as well as the lubricant of the reservoir. The regulator may ensure that the pressure within the reservoir is greater than the pressure of the dirty environment. Due to the higher pressure within the reservoir, the bearing may be preferentially filled with lubricant rather than dirty fluid from the environment.

10 Claims, 4 Drawing Sheets

Section A/A

DEBRIS RESISTANT BEARING SYSTEM AND METHOD

BACKGROUND

1. Field of the Invention

This invention relates to bearing systems for use in dirty environments and, more particularly, to apparatus and methods for bearing systems suitable for use on a pipeline inspection tool.

2. Background of the Invention

Oil, petroleum products, natural gas, hazardous liquids, water, and the like are often transported using pipelines. The majority of these pipelines are constructed from steel pipe. Once installed, a pipeline will inevitably corrode or otherwise degrade. Proper pipeline management requires identification, monitoring, and repair of defects and vulnerabilities of the pipeline. For example, information collected about the condition of a pipeline may be used to determine safe operating pressures, facilitate repair, schedule replacement, and the like.

Typical defects of a pipeline may include corrosion, gouges, dents, cracks, and the like. Corrosion may cause pitting, general wall loss, or cracking, thereby lowering the maximum operating pressure of the pipeline. Vulnerabilities may also include combined stress and chemical or biological action such as stress corrosion cracking. Without detection and preemptive action, all such defects and vulnerabilities may lead to pipeline failure.

Information on the condition of a pipeline is often collected using an in-line inspection (ILI) tool. While collecting such information, an in-line inspection tool is exposed to the adverse environment within a pipeline. That is, pipelines carrying material such as crude oil, natural gas, petroleum products, and raw water typically operate with both high pressure and suspended debris. This environment is often worsened by the presence on an in-line inspection tool, which tends to loosen and stir settled debris as it passes through the pipeline.

The adverse pipeline environment can damage an in-line inspection tool. For example, bearings used on an in-line inspection tool are susceptible to frequency failure. Attempts have been made to seal bearings for use in dirty environments. However, in a high pressure environment like a pipeline, seals tend to be limited in their effectiveness.

In view of the foregoing, what is needed is a debris resistant bearing suitable for use in dirty environments such as the environment within a pipeline.

SUMMARY

A bearing system in accordance with the present invention may prolong the life of one or more bearings operating in a dirty environment. For example, a bearing system may protect the bearings of an odometer operating in a pipeline environment. A bearing system may protect a bearing by imparting, to the bearing, lubricant at a greater pressure than the pressure of the surrounding environment. Accordingly, as a bearing rotates, the pressurized lubricant may preferentially work its way into and through the bearing, both blocking lower pressure, environmental contaminants from entering the bearing and flushing the bearing free of debris.

In selected embodiments, a bearing system may include a reservoir containing lubricant. Accordingly, a bearing may border on both a dirty environment and a reservoir. By created a higher pressure within the reservoir, the bearing may be preferentially filled with lubricant rather than unwanted material from the surrounding environment. Moreover, the reservoir may ensure that a flow of lubricant through a bearing continues for a period of time sufficient to accomplish the intended mission.

A bearing system may include a regulator ensuring that the pressure of the lubricant (e.g., the pressure within the reservoir) is greater than the pressure of the surrounding environment. In selected embodiment, an axle and a plunger translating in the axial direction within the axle may combine to form a regulator in accordance with the present invention.

For example, a plunger may have a first surface bounding the dirty environment and a second surface bounding the reservoir. These first and second surfaces may each define a footprint in the axial direction. The footprint of the first surface may be larger in area than the footprint of the second surface. This differential in area may be used to create a differential in pressure between the environment and the reservoir.

That is, a plunger may be free to translate within an axle. Accordingly, the plunger may move until it reaches an equilibrium position at which the axial force urging it in one direction is equal to the axial force urging it in an opposite direction. With pressure being equal to force divided by area, when the axial forces are equal, a larger area will result in a lower pressure. Accordingly, by making the footprint of the first surface larger in area than the footprint of the second surface, the bearing system may ensure that the pressure within the reservoir is always greater than the pressure of the surrounding environment.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION

Figure 1:
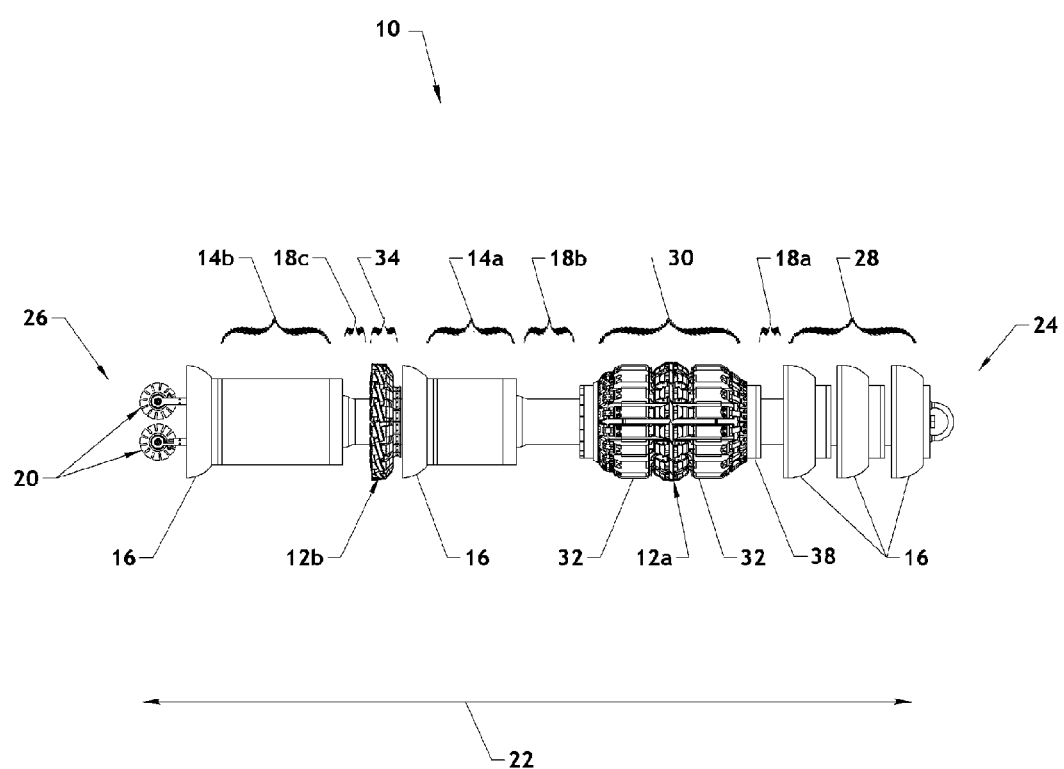
FIG. 1 is a side elevation view of one embodiment of an in-line inspection tool in accordance with the present invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention as claimed, but is merely representative of various embodiments of the invention. The illustrated embodiments of the invention will be best understood by reference to the drawings, wherein like parts are designated by like numerals throughout.

Referring to FIG. 1, an in-line inspection tool 10 or vehicle 10 in accordance with the present invention may comprise various components including one or more inspection assemblies 12, canisters 14, driving cups 16, couplers 18, position sensors 20, and the like. Depending on the configuration of the in-line inspection tool 10 and the size of the pipeline to be inspected, the arrangement and number of components (e.g., the number of canisters 14) may vary.

Canisters 14 may house equipment such as one or more processors, memory devices, and batteries. The driving cups 16 may center the tool 10 within the pipeline and enable fluid traveling within a pipeline to engage the tool 10, thereby pushing the tool 10 through the pipeline. In selected embodiments, driving cups 16 may be formed of a somewhat flexible polyurethane or similar material. Couplers 18 may support bending of the tool 10, enabling the tool 10 to accommodate bends in the pipeline. Like the driving cups 16, in selected embodiments the couplers 18 may be formed of somewhat flexible polyurethane or similar material. Alternatively, couplers 18 may comprise a mechanical pivoting device.

An in-line inspection tool 10 may extend in a longitudinal direction 22 from a head end 24 to a tail end 26. The various components 12, 14, 16, 18, 20 of an in-line inspection tool 10 may be arranged in series. For example, in the illustrated embodiment, the head end 24 of a tool 10 may comprise a head section 28 comprising one or more driving cups 16. Following the head section 28 may be a primary sensor suite 30. A coupler 18a may extend to connect the head section 28 to the primary sensor suite 30.

In selected embodiments, an in-line inspection tool 10 in accordance with the present invention may include one or more inspection assemblies 12 connected to an interior structure 38 (e.g., interior cylinder 38). Each inspection assembly 12 may include one or more magnets 32, signal sources, sensors, or combinations thereof positioned so as to travel along the interior of a pipe wall being inspected. Such signal sources and sensors may generate and receive a wide variety of signals oriented in any of many directions based on characteristics of the inspection technology or technologies being employed. Suitable inspection technologies may include magnetic flux leakage inspection, ultrasonic inspection, inspection using an electromagnetic acoustic transducer (EMAT), and eddy current inspection.

Following the primary sensor suite 30 may be a first canister 14a. In one embodiment, the first canister 14a may house the hardware providing the processing and memory devices for the in-line inspection tool 10. A coupler 18b may extend to connect the primary sensor suite 30 to the first canister 14a.

The first canister 14a may be followed by another driving cup 16. A coupler 18c may engage a first canister 14a and extend rearward to engage a second canister 14b. In one embodiment, the second canister 14b may house batteries providing the power for the in-line inspection tool 10. In selected embodiments, a driving cup 16 may connect to the second canister 14b. One or more position sensors 20 may then engage the second canister 14b, driving cup 16, or some combination thereof to form the tail end 26 of the in-line inspection tool 10.

Figure 2:
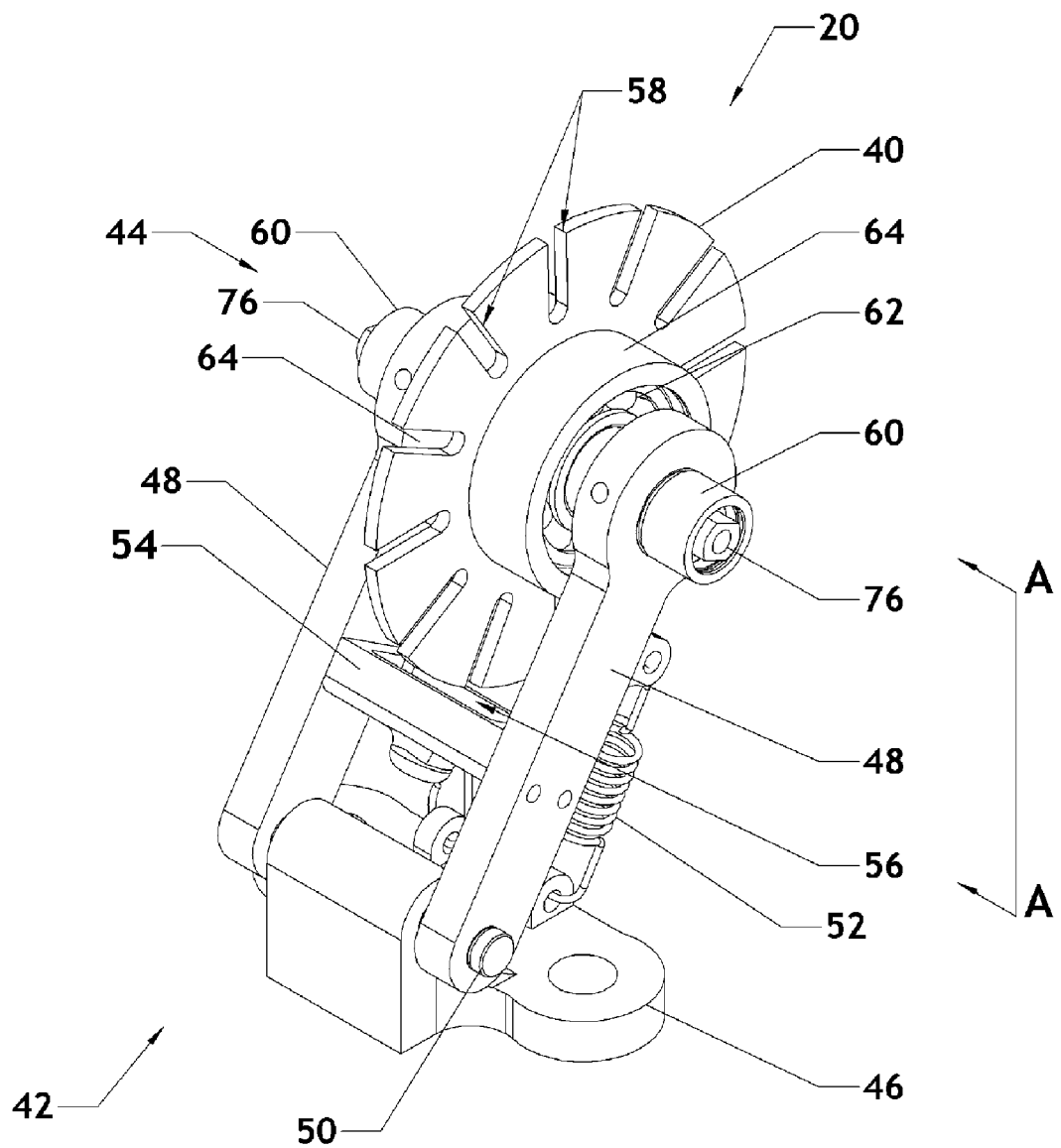
FIG. 2 is a perspective view of one embodiment of an odometer for tracking the distance traveled and speed of an in-line inspection tool, the odometer having a bearing system in accordance with the present invention.
Figure 3:
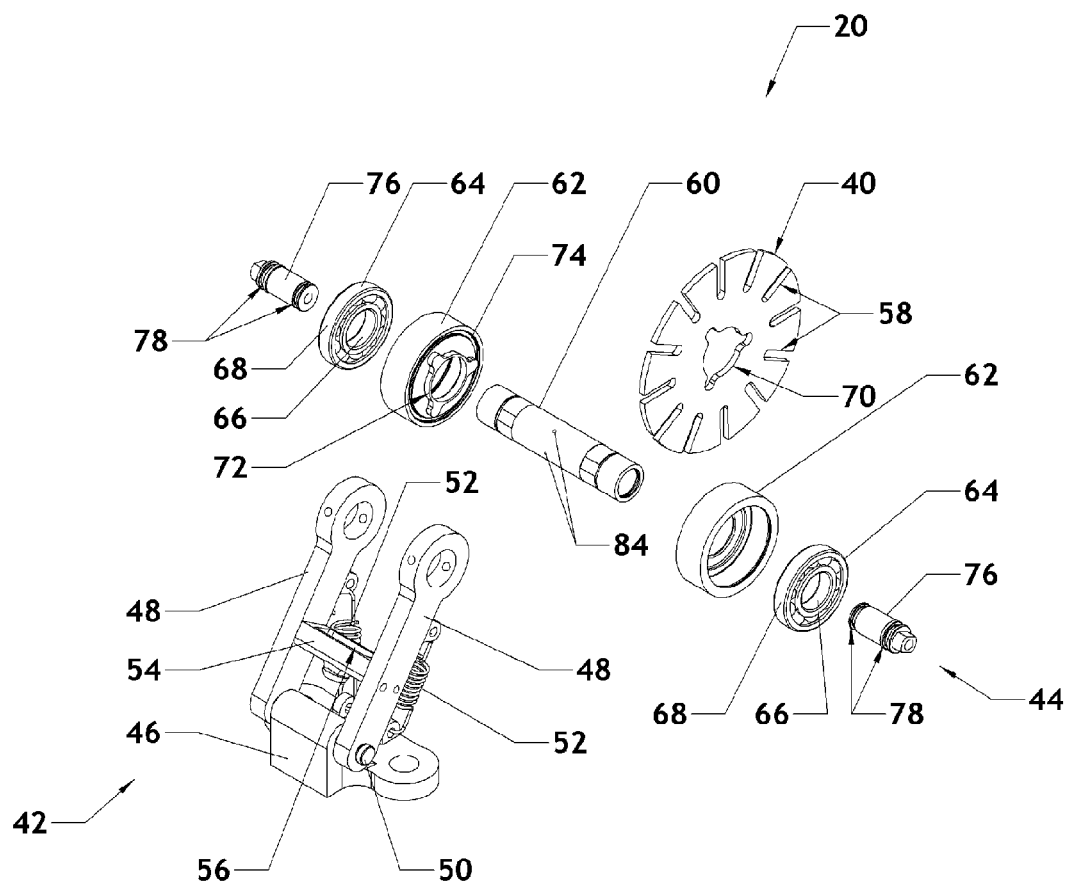
FIG. 3 is a perspective exploded view of the odometer of FIG. 2.

Referring to FIGS. 2 and 3, in selected embodiments, a position sensor 20 in accordance with the present invention may comprise an odometer 20 positioned to roll along the interior surface of a pipeline, measuring the distance traveled by an in-line inspection tool 10. In certain embodiments, an odometer 20 may include a wheel 40 for rolling along a pipeline, a mount 42 for connecting the wheel 40 to the rest of the in-line inspection tool 10, and a bearing system 44 forming the interface between a mount 42 and a wheel 40.

A mount 42 may provide a suspension system enabling a wheel 40 to roll along the interior of a pipeline despite irregularities therein or thereon. In selected embodiments, a mount 42 may include a base 46 bolted or otherwise fastened to the rest of an in-line inspection tool 10. One or more swing arms 48 may extend from the base 46 to engage the bearing system 44. A pin 50 may pivotably connected one or more swing arms 48 to the base 46.

To bias a wheel 40 toward contact with the interior surface of a pipeline, a mount 42 may include one or more biasing members 52 (e.g., coil springs 52). A biasing member 52 may extend to connect a swing arm 48 to the base 46. In certain embodiments, a mount 42 may include two swing arms 48. In such embodiments, the mount 42 may include two biasing members 52. One biasing member 52 may extend between a first swing arm 48 and the base 46. The other biasing member 52 may extend between a second swing arm 48 and the base 46.

In selected embodiments, a mount 42 may include a cross bar 54 extending to connect two or more swing arms 48 together. A cross bar 54 may ensure that the swing arms 48 of a mount 42 pivot together. Additionally, in certain embodiments, a cross bar 54 may provide a location 56 for securing a sensor for monitoring the motion of a wheel 40.

A wheel 40 in accordance with the present invention may include multiple radial slots 58 distributed evenly about the circumference thereof. Such slots 58 may enable a sensor (e.g., a sensor mounted to a cross bar 54) to detect incremental movement of the wheel as it rolls along the interior surface of a pipeline. For example, a wheel 40 may be formed of a ferrous material. A sensor positioned in a cross bar 54 may comprise one or more magnets producing a magnetic field. Disruptions in the magnetic field caused by the passage of a slot 58 thereby or therethrough may be detected. Thus, the speed, distance traveled, etc. of an in-line inspection tool 10 may be determined by monitoring the passage of slots 58.

A bearing system 44 in accordance with the present invention may take many forms, depending on the nature of the larger system to which it is applied. While a bearing system 44 suitable for use on an odometer 20 will be described herein, the concepts disclosed may be applied to other systems. Thus, bearing systems 44 in accordance with the present invention are not limited to odometer applications.

In selected embodiments, a bearing system 44 may include an axle 60, one or more bearing housings 62, and one or more bearings 64. In the illustrated embodiment, the bearing system 44 includes two bearing housings 62 and two bearings 64. Each bearing 64 may include an inner race 66 and an outer race 68. Each bearing 64 may be pressed into a corresponding housing 62 such that the outer race 68 statically engages (e.g., frictionally binds with) the bearing housing 62. The bearings 64 and bearing housing 62 may then be pressed onto the axle 60. Each bearing 64 may be pressed onto the axle 60 such that the inner race 66 statically engages (e.g., frictionally binds with) the axle 60.

In certain embodiments, the bearings 64 and bearing housings 62 may be pressed along the axle 60 such that one set 62, 64 is one side of the wheel 40 and the other set 62, 64 is on the other side of the wheel 40. The two sets of bearings 64 and bearing housings 62 may be pressed toward one another until the wheel 40 is properly positioned and sealed tightly between the two opposing bearing housings 62.

A bearing housing 62 in accordance with the present invention may include various features facilitating engagement with a wheel 40. For example, a central aperture extending through a wheel 40 may form a keyway 70. Accordingly, one or both of the bearing housings 64 abutting a wheel 40 may have a key 72 matching or fitting the keyway 70. Such an interface between a bearing housing 64 and a wheel 40 may tend to center a wheel 40 on the axle 60 (particularly in embodiments where a wheel 40 does not directly touch an axle 60) and ensure a rotationally static (e.g., non-slip) engagement therebetween.

In selected embodiments, the surface of a bearing housing 62 abutting a wheel 40 may have a groove 74 formed therein. When a bearing system 44 is assembled, the groove 74 may house a seal (e.g., an elastomeric O-ring). Accordingly, a bearing system 44 may be sealed against incursion of fluid and debris from a surrounding environment.

In certain embodiments, an axle 60 in accordance with the present invention may be formed as a hollow cylinder. On or more plungers 76 may be positioned to translate axially within the interior of the axle 60. In selected embodiments, one plunger 76 may be positioned within a axle 60 proximate a first end of the axle 60, while another plunger 76 is positioned within the axle 60 proximate a second end, opposite the first end.

The surface of a plunger 76 adjacent the interior surface of an axle 60 may have one or more grooves 78 formed therein. When a bearing system 44 is assembled, each groove 78 may house a seal (e.g., an elastomeric O-ring). Accordingly, a plunger 76 may seal the interior of an axle 60 against incursion of fluid and debris from a surrounding environment.

Figure 4:
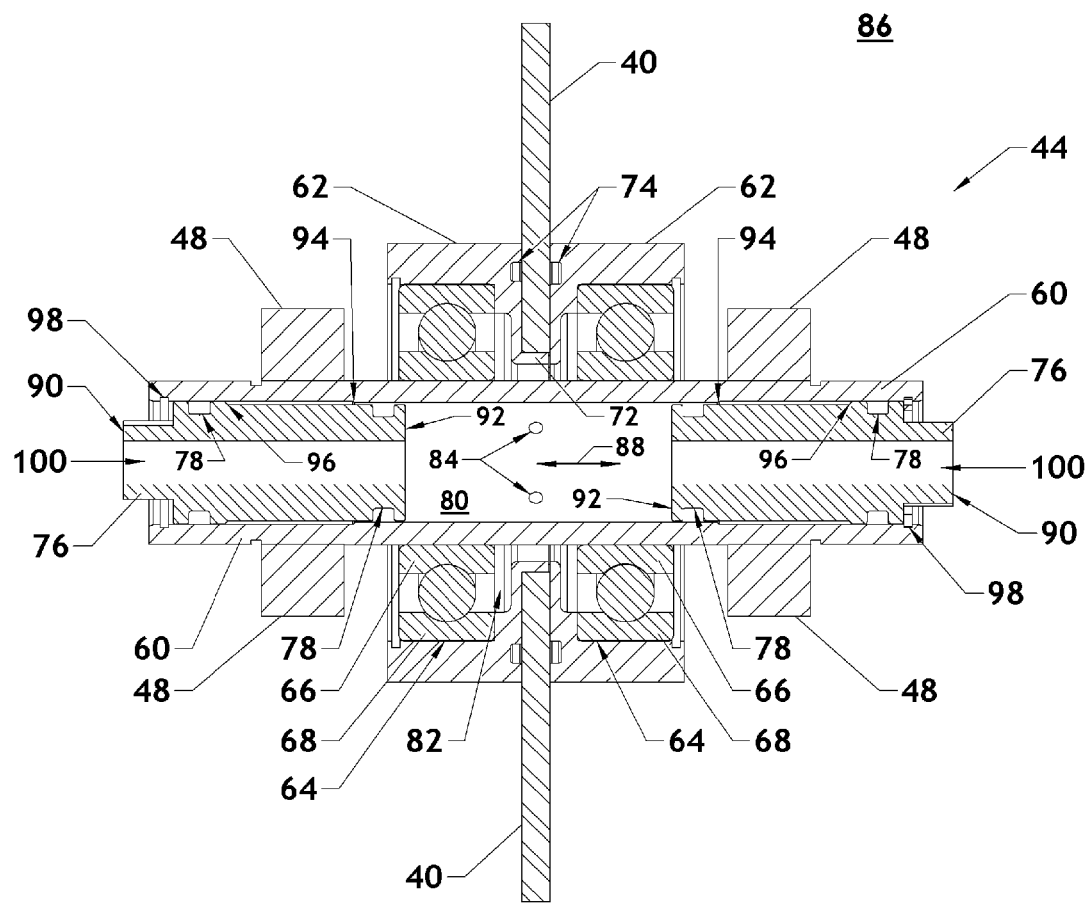
FIG. 4 is a cross-sectional view of the odometer of FIG. 2.

Referring to FIGS. 3 and 4, in selected embodiments, an axle volume 80 contained within an axle 60 and between opposing plungers 76 may be connected to a bearing volume 82 located exterior to the axle 60 and between opposing bearings 64. The connection may be made by one or more apertures 84 extending radially through the cylinder wall of an axle 60. Accordingly, the axle volume 80 and bearing volume 82 may be in fluid communication with one another.

Referring to FIG. 4, in certain embodiments, a bearing system 44 may protect one or more bearings 64 operating in a dirty environment 86. For example, in the illustrated embodiment, a bearing system 44 may protect the bearings 64 of an odometer 20 operating in a pipeline environment 86. Pipelines carrying crude oil, natural gas, petroleum products, or raw water typically operate with both high pressure and suspended debris. This environment 86 is often worsened by the presence on the in-line inspection tool 10 itself, which tends to loosen and stir settled debris as it passed through the pipeline.

A bearing system 44 may protect a bearing 64 by imparting thereto lubricant (e.g., a high viscosity lubricant, oil, grease, etc.) at a greater pressure than the pressure of the surrounding environment 86. Accordingly, as a bearing 64 rotates, the pressurized lubricant may preferentially work its way into and through the bearing 64, both blocking lower pressure, environmental contaminants from entering the bearing 64 and flushing the bearing 64 free of debris.

In selected embodiments, a bearing system 44 may include a reservoir containing lubricant. Accordingly, a bearing 64 may border on both a dirty environment 86 and a reservoir. By created a higher pressure within the reservoir, the bearing 64 may be preferentially filled with lubricant rather than unwanted material from the surrounding environment 86. Moreover, the reservoir may ensure that a flow of lubricant through a bearing 64 continues for a period of time sufficient to accomplish the mission at hand (e.g., one pipeline run). In the illustrated embodiment, the axle volume 80, bearing volume 82, and apertures 84 in the axle 60 may combine to form a reservoir in accordance with the present invention.

In certain embodiments, a bearing system 44 may include a regulator ensuring that the pressure of the lubricant (e.g., the pressure within the reservoir) is greater than the pressure of the surrounding environment 86. In the illustrated embodiment, an axle 60 and a plunger 76 translating in the axial direction 88 therewithin may combine to form a regulator in accordance with the present invention.

For example, a plunger 76 may have a first surface 90 bounding the environment 86 and a second surface 92 bounding the reservoir (e.g., the axle volume 80, which may form part of the reservoir). These first and second surfaces 90, 92 may each define a footprint in the axial direction 88. However, the footprint of the first surface 90 may be larger in area than the footprint of the second surface 92. This differential in area may be used to create a differential in pressure between the environment 86 and the reservoir.

That is, a plunger 76 may be free to translate within an axle 60 through a range of motion in the axial direction 88. Accordingly, the plunger 76 may move within that range of motion until it reaches an equilibrium position, where the axial force urging it in one direction is equal to the axial force urging it in an opposite direction. While the axial forces may be equal to one another, the differential in area between the first and second surfaces 90, 92 may ensure that the pressure acting thereon will not be equal. With pressure being equal to force divided by area, when the axial forces are equal, a larger area will result in a lower pressure. Accordingly, by making the footprint of the first surface 90 larger in area than the footprint of the second surface 92, the bearing system 44 may ensure that the pressure within the reservoir is always greater than the pressure of the surrounding environment 86.

In selected embodiments, to accommodate a differential in area between the footprint of the first surface 90 and the footprint of the second surface 92, an axle 60 may include a transition 94. At a transition 94, the interior surface of the axle 60 may transition from one inner diameter to another, smaller, inner diameter.

A plunger 76 may overlay a transition 94 of an axle 60. Moreover, a plunger 76 may include a transition 96 of its own. At the transition 96 of a plunger 76, the exterior surface thereof may transition from one outer diameter to another, smaller, outer diameter. The portion of a plunger 97 having the larger outer diameter may correspond to, and translate within, the portion of the axle 60 having the larger inner diameter. Additionally, the portion of a plunger 97 having the larger outer diameter may produce the end 90 having the larger footprint, when viewed in the axial direction 88.

The range of motion of a plunger 76 within an axle 60 may have limits. In selected embodiments, one limit may correspond to the transitions 94, 96 formed in the axle 60 and plunger 76. For example, once the transition of a plunger 76 contacts the transition 84 of an axle 60, further motion in that direction may be precluded. The other or opposite limit to the range of motion may be imposed by a mechanical stop. In certain embodiments, the mechanical stop may be selectively removable, facilitating assembly and disassembly of the bearing system 44. In one embodiment, a mechanical stop may comprise a locking ring position within a channel 98 formed in the axle 60.

A plunger 76 may have an aperture 100 or channel 100 extending therethrough (e.g., axially therethrough). In certain embodiments, an aperture 100 may provide a conduit for charging or refilling a reservoir with lubricant. A check valve may be positioned to regulate the passage of material through the aperture 100. For example, a check valve may be positioned to admit lubricant into the reservoir and resist release of lubricant from the reservoir. Alternatively, an aperture 100 may be fitted with a cap or seal. Accordingly, lubricant may be pumped through a plunger 76 and into a reservoir on the opposite side thereof, permitting a reservoir to be quickly and easily refilled without significant disassembly.

In selected embodiments, a bearing assembly 44 in accordance with the present invention may include only one plunger 76. In such embodiments, the end of an axle 60 opposite the plunger 76 may be capped or sealed to form a static boundary to the axle volume 80 (e.g., reservoir).

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A system comprising:
    an environment comprising a fluid exhibiting a first pressure; and
    a bearing subsystem comprising
        a reservoir comprising a lubricant exhibiting a second pressure,
        a first bearing bordering on both the environment and the reservoir, and
        a regulator comprising a cylinder, defining an axial direction, and first and second plungers within the cylinder, the first and second plungers positioned to translate within the cylinder in the axial direction, the first and second plungers each comprising a first surface bounding the environment and a second surface bounding the reservoir, each of the first and second surfaces defining a footprint in the axial direction, the footprint of each first surface being larger in area than the footprint of each second surface, thereby ensuring that the second pressure is greater than the first pressure.

2. The system of claim 1, further comprising a pipeline containing the environment therewithin.

3. The system of claim 2, further comprising an in-line inspection tool traveling through the pipeline.

4. The system of claim 3, wherein the in-line inspection tool comprises an odometer comprising a mount and a wheel, the mount positioning the wheel to roll along the interior of the pipeline.

5. The system of claim 4, wherein the bearing subsystem forms the interface between the mount and the wheel.

6. The system of claim 5, wherein the first bearing comprises an inner race and an outer race, the inner race being statically connected to the cylinder, the outer race being statically connected to the wheel.

7. The system of claim 6, wherein the mount is statically connected to the cylinder.

8. The system of claim 7, wherein the second bearing comprises an inner race and an outer race, the inner race thereof being statically connected to the cylinder, the outer race thereof being statically connected to the wheel, opposite the first bearing.

9. The system of claim 8, wherein the cylinder comprises a wall.

10. The system of claim 9, wherein the reservoir comprises a first volume located exterior to the cylinder and between the first and second bearings, a second volume located within the cylinder and between the first and second plungers, and at least one aperture extending through the wall to connect the first volume to the second volume.

* * * * *